United States Patent Office 2,720,465
Patented Oct. 11, 1955

2,720,465

METHOD OF CONDITIONING STARCH FOR ENZYMIC CONVERSION

Walter R. Fetzer and Robert M. Hamilton, Clinton, Iowa, assignors to Clinton Foods, Inc., Clinton, Iowa, a corporation of Delaware No Drawing. Application February 11, 1950, Serial No. 143,826

5 Claims. (Cl. 106—210)

This invention relates to the treatment of starch to condition it for enzymic conversion.

While other starches and other uses may benefit from this discovery, the invention is more particularly concerned with the treatment of corn starch for enzymic conversion in connection with paper coating and textile sizing.

For illustrating the commercial application of the invention, reference will be made herein to its use in paper coating.

When paper manufacturers, for example, employ corn starch for paper coating, they usually purchase dry raw starch, slurry it in water, heat the slurry to cook or "paste" the stach and subject the pasted starch to enzymic conversion to render the starch highly soluble in water. The raw starch which they purchase is practically insoluble in cold water, but when treated as above described becomes highly soluble in cold water.

The enzymic conversion requires close control and the careful maintenance of conditions favorable to optimum conversion and resultant uniform solubility. Substantially complete solubility of the starch is necessary as uniform coating of the paper is a positive requirement in paper manufacture.

However, we have found that uniform enzyme conversion at the paper mill may be difficult to obtain or often entirely inhibited, because the enzyme has been inactivated or poisoned through heavy metal ions, such as copper, which are present in the pasted starch. The source of the heavy metal contamination comes from the water used in producing the original slurry or from metal pick up from the equipment used in processing. A failure to convert the starch paste into a soluble starch, results in the loss of the starch and expensive enzyme. Partial conversion results in a product which produces non-uniform paper coating operation.

We have discovered that if monocalcium phosphate is added to the starch prior to the enzymic conversion, the monocalcium phosphate forms non-ionized complexes with the heavy metal ions and thereby prevents the metal from inhibiting the enzymic conversion. Only a very small proportion of the phosphate is needed, and this should be widely dispersed from uniform availability.

The general object of the invention is to improve starch for enzymic conversion by the addition of monocalcium phosphate thereto.

Another object of the invention is to thus condition the starch in an economical manner and at the same time insure uniformity of dispersion of the phosphate in the starch.

We have discovered that advantage may be taken of the fact that the monocalcium phosphate has only a very limited solubility in cold water, but much greater in hot water. Hence, uniform dispersion of it in the starch may be obtained by mixing even a small quantity of it in a starch slurry during the manufacture of the starch just prior to the final filtering of the starch in the customary wet starch manufacturing process. The starch cake accumulating on the filter acts as a filter bed and entraps the monocalcium phosphate therein. It is relatively easy to uniformly disperse a small proportion of the monocalcium phosphate in the starch slurry by ordinary methods of agitation, hence the filter cake will contain a uniform dispersion of the phosphate.

During the subsequent drying of the starch to prepare it for usual shipment in dried form, the monocalcium phosphate adheres to the starch granules without loss of uniformity of dispersion therein.

Subsequently, when put to use each measured quantity, for example, a hundred pound bag of dry starch, or any fractional part or multiple thereof, will contain the right amount of the monocalcium phosphate required to prevent the heavy metal ions from inhibiting the enzymic conversion.

As the monocalcium phosphate is readily soluble in hot water it passes into solution during the cooking of the starch and becomes thus readily available in the right quantity to form non-ionized complexes with the metal ions then present.

The temperature at which the cooking of the starch and its conversion are accomplished may appropriately conform to standard practice, that is, about 165° F.

Experience at the paper mills indicates that the starch treated in accordance with this invention should carry about 0.3% of the monocalcium phosphate, expressed as a percentage of the dry starch substance. More than that percentage will seldom be needed, hence as a matter of economy, only about 0.3% of the phosphate need be added to the starch.

As a guide for determining the percentage of monocalcium phosphate which should be added, we recommend adding about three (3) pounds of monocalcium phosphate per thousand (1000) pounds of dry starch, when the copper contamination of the slurry does not exceed five (5) parts per million. The copper content of the paste, here referred to, is believed to be a good general criterion of the phosphate required, as it is felt that copper is particularly deleterious to enzymic conversion and in commercial practice usually is the only metal contamination which need be considered. Hence, it may be considered that if the copper contamination be greater the phosphate may be increased on the basis of the proportions indicated above. If the metal contamination be great enough to inhibit enzymic conversion it is measurable and the phosphate dosage determined to meet the need.

When referring herein to cold water, reference is had to water at ordinary factory temperatures, ranging from ordinary room temperatures downwardly, it not being inferred that any particular low temperature is contemplated or required.

One form of filter which may be employed to dewater the starch and at the same time deposit the starch and phosphate in a uniform mixture is a rotary filter, the starch being flowed onto the exterior of the rotating filter, the water being sucked into the filter interior for discharge. On such a filter the starch cake is preferably washed to free it of soluble impurities, while insoluble monocalcium phosphate remains in the cake.

While it seems possible that the phosphate might be added to the starch at the paper mill, practical experience with paper mill operations teaches that the operatives cannot be relied upon to add it or to properly proportion such a relatively minute quantity, nor could such mode of addition be relied upon to yield at all times a uniformity of dispersion. A failure in the enzymic conversion, or a succession of unpredictable failures and successes would needlessly introduce operational losses of serious proportions. Hence, the most practical and economical method of conditioning the starch is to add the monocalcium phosphate at the starch factory as outlined above, although by the exercise of considerable care dry uniform blending of the monocalcium phosphate and starch could probably be accomplished.

While we have described herein a preferred method of practicing the invention, it should be understood that some variation therein may be utilized without departing from the scope of the invention defined in the appended claims.

We claim as our invention:

1. A method of conditioning starch for enzymic conversion comprising forming a uniform mixture of a cold aqueous slurry of starch and a quantity of monocalcium phosphate in the proportion of about 3 pounds of said phosphate to 1000 pounds of starch, filtering the mixture and subsequently drying the mixed material.

2. A method of conditioning starch for enzymic conversion in an aqueous solution contaminated by copper comprising uniformly mixing with a cold aqueous slurry of starch a quantity of monocalcium phosphate in the proportion of about 3 pounds of said phosphate to 1000 pounds of starch per five parts per million of copper contamination calculated to be present in a subsequently formed aqueous solution during enzymic conversion, filtering the mixture of starch and phosphate and subsequently drying the mixed material.

3. A method of conditioning starch for enzymic conversion in an aqueous solution contaminated with copper, comprising uniformly dispersing in a cold aqueous slurry of starch a quantity of monocalcium phosphate in the ratio of, for each five parts per million of copper contamination, three pounds of said phosphate to each 1000 pounds of starch, dewatering the starch slurry and maintaining the phosphate in uniform dispersion therein during dewatering, and drying the mixture of starch and phosphate.

4. A dry starch mixture for use in enzyme conversion thereof consisting only of raw corn starch in dry condition containing uniformly dispersed therein about 0.3% monocalcium phosphate, expressed as a percentage of the dry starch substance.

5. A method of conditioning and utilizing starch for enzymic conversion to produce a coating material comprising treating starch milk immediately prior to the final filtering thereof during the wet process manufacture of the starch by uniformly dispersing in the cold starch milk a quantity of monocalcium phosphate in the ratio of about three pounds of the phosphate per thousand pounds of starch, filtering the starch milk while depositing the phosphate on the starch cake, drying the starch, subsequently cooking the starch in hot water and subjecting it to enzymic conversion for production of the coating material.

References Cited in the file of this patent

UNITED STATES PATENTS

| | | |
|---|---|---|
| 1,558,888 | Jones | Oct. 27, 1925 |
| 2,204,384 | Salisbury | June 11, 1940 |
| 2,291,608 | Cobbs | Aug. 4, 1942 |
| 2,291,609 | Cobbs | Aug. 4, 1942 |
| 2,497,838 | Newton | Feb. 14, 1950 |